(12) United States Patent
Smith

(10) Patent No.: US 10,109,201 B2
(45) Date of Patent: Oct. 23, 2018

(54) VEHICLE MONITORING DEVICES, VEHICLE MONITORING MANAGEMENT DEVICES, AND VEHICLE MONITORING SYSTEMS

(71) Applicant: AutoMap, LLC, Kellogg, ID (US)

(72) Inventor: Michael Smith, Hillsboro, OR (US)

(73) Assignee: AutoMap, LLC, Kellogg, ID (US)

( * ) Notice: Subject to any disclaimer, the term of this patent is extended or adjusted under 35 U.S.C. 154(b) by 255 days.

(21) Appl. No.: 14/796,218

(22) Filed: Jul. 10, 2015

(65) Prior Publication Data

US 2016/0275799 A1 Sep. 22, 2016

Related U.S. Application Data

(60) Provisional application No. 62/136,329, filed on Mar. 20, 2015.

(51) Int. Cl.
| | |
|---|---|
| *G08G 1/00* | (2006.01) |
| *G06Q 10/08* | (2012.01) |
| *G06Q 40/02* | (2012.01) |
| *G07C 5/10* | (2006.01) |

(52) U.S. Cl.
CPC ........... *G08G 1/207* (2013.01); *G06Q 10/087* (2013.01); *G06Q 40/02* (2013.01); *G07C 5/10* (2013.01)

(58) Field of Classification Search
CPC .......... G08G 1/20; G08G 1/207; G07C 5/008; G07C 5/10; G06Q 10/087
See application file for complete search history.

(56) References Cited

U.S. PATENT DOCUMENTS

| | | | |
|---|---|---|---|
| 6,806,814 B1 * | 10/2004 | Iverson | G08G 1/20 340/5.74 |
| 7,149,206 B2 * | 12/2006 | Pruzan | G07C 5/008 340/438 |
| 7,774,268 B2 | 8/2010 | Bradley | |

(Continued)

OTHER PUBLICATIONS

WO PCT/US2016/022213 Inc/Pay Fees, dated May 5, 2016, Automap, LLC.

(Continued)

*Primary Examiner* — Jerrah Edwards
*Assistant Examiner* — Donald J Wallace
(74) *Attorney, Agent, or Firm* — Wells St. John P.S.

(57) ABSTRACT

Vehicle monitoring devices, vehicle monitoring management devices, and vehicle monitoring systems are described. According to one aspect, a vehicle monitoring device includes first circuitry configured to communicate with a vehicle being monitored and to receive information regarding the vehicle at a plurality of moments in time, second circuitry coupled with the first circuitry and configured to generate a plurality of messages, wherein individual ones of the messages include the information regarding the vehicle which was received at one of the plurality of moments in time and timing data which is indicative of timing of the vehicle data according to an independent timing protocol which is utilized by the vehicle monitoring device and another device which is remote from the vehicle monitoring device, and wherein the first circuity is configured to communicate the plurality of messages externally of the vehicle monitoring device.

35 Claims, 4 Drawing Sheets

(56) References Cited

U.S. PATENT DOCUMENTS

| | | | | |
|---|---|---|---|---|
| 7,853,375 | B2* | 12/2010 | Tuff | G01P 1/07 |
| | | | | 701/32.6 |
| 8,126,399 | B1* | 2/2012 | Lee | H04W 8/26 |
| | | | | 455/41.2 |
| 8,180,522 | B2* | 5/2012 | Tuff | G01P 1/07 |
| | | | | 701/32.5 |
| 8,565,963 | B2 | 10/2013 | Burke, Jr. | |
| 8,868,289 | B2 | 10/2014 | Miljkovic et al. | |
| 8,884,749 | B1* | 11/2014 | Palmer | B60K 37/04 |
| | | | | 340/438 |
| 8,897,952 | B1* | 11/2014 | Palmer | G07C 5/008 |
| | | | | 701/29.1 |
| 9,349,223 | B1* | 5/2016 | Palmer | G07C 5/008 |
| 2002/0070851 | A1* | 6/2002 | Raichle | G08G 1/20 |
| | | | | 340/438 |
| 2003/0058280 | A1* | 3/2003 | Molinari | G01R 13/345 |
| | | | | 715/771 |
| 2006/0178793 | A1* | 8/2006 | Hecklinger | G06Q 10/10 |
| | | | | 701/29.1 |
| 2006/0277498 | A1* | 12/2006 | Mann | G06F 3/0481 |
| | | | | 715/825 |
| 2006/0277499 | A1* | 12/2006 | Britt | G06F 9/4443 |
| | | | | 715/828 |
| 2008/0000959 | A1* | 1/2008 | Faoro | B60R 25/00 |
| | | | | 235/375 |
| 2008/0082221 | A1 | 4/2008 | Nagy | |
| 2008/0084334 | A1* | 4/2008 | Ballew | G06Q 10/06 |
| | | | | 340/990 |
| 2008/0126358 | A1* | 5/2008 | Turner | G06F 17/30867 |
| 2008/0137860 | A1* | 6/2008 | Silvernail | H04W 12/04 |
| | | | | 380/270 |
| 2008/0140281 | A1* | 6/2008 | Morris | G07C 5/008 |
| | | | | 701/31.4 |
| 2008/0147268 | A1* | 6/2008 | Fuller | B60R 25/24 |
| | | | | 701/33.4 |
| 2008/0228346 | A1* | 9/2008 | Lucas | G06Q 10/087 |
| | | | | 701/31.4 |
| 2009/0015373 | A1* | 1/2009 | Kelly | B60R 25/2081 |
| | | | | 340/5.62 |
| 2009/0150118 | A1 | 6/2009 | Naima | |
| 2009/0184812 | A1* | 7/2009 | Drew | B60K 35/00 |
| | | | | 340/438 |
| 2010/0228585 | A1* | 9/2010 | Bradley | G06K 17/00 |
| | | | | 705/38 |
| 2010/0265104 | A1* | 10/2010 | Zlojutro | G07C 5/008 |
| | | | | 340/990 |
| 2010/0286912 | A1 | 11/2010 | Inoue | |
| 2010/0322423 | A1* | 12/2010 | Boehler | G01P 1/122 |
| | | | | 380/255 |
| 2011/0063138 | A1* | 3/2011 | Berkobin | G08G 1/207 |
| | | | | 340/988 |
| 2011/0227709 | A1 | 9/2011 | Story | |
| 2011/0258044 | A1* | 10/2011 | Kargupta | G06Q 10/08 |
| | | | | 705/14.49 |
| 2011/0313593 | A1* | 12/2011 | Cohen | G01S 5/0027 |
| | | | | 701/2 |
| 2012/0106342 | A1* | 5/2012 | Sundararajan | H04L 47/193 |
| | | | | 370/235 |
| 2012/0246036 | A1* | 9/2012 | Marr | G06Q 30/08 |
| | | | | 705/27.1 |
| 2013/0181817 | A1* | 7/2013 | Shoarinejad | G06Q 20/409 |
| | | | | 340/10.1 |
| 2013/0289819 | A1* | 10/2013 | Hassib | G06F 17/00 |
| | | | | 701/29.6 |
| 2013/0335233 | A1 | 12/2013 | Kamar et al. | |
| 2014/0025955 | A1* | 1/2014 | Bodin | G07C 5/04 |
| | | | | 713/176 |
| 2014/0195100 | A1* | 7/2014 | Lundsgaard | G07C 5/0841 |
| | | | | 701/29.6 |
| 2015/0029041 | A1 | 1/2015 | Liu et al. | |
| 2015/0161403 | A1* | 6/2015 | Toillon | H04L 9/3236 |
| | | | | 726/30 |

OTHER PUBLICATIONS

WO PCT/US2016/022213 Search Rept, dated Jul. 4, 2016, Automap, LLC.
WO PCT/US2016/022213 Writ Opin, dated Jul. 4, 2016, Automap, LLC.
Smith, "Object Monitoring System and Methods", U.S. Appl. No. 62/136,329, filed Mar. 20, 2015, 15 pages.
PCT/US2016/022213 IPRP, dated Sep. 26, 2017, Automap, LLC.

* cited by examiner

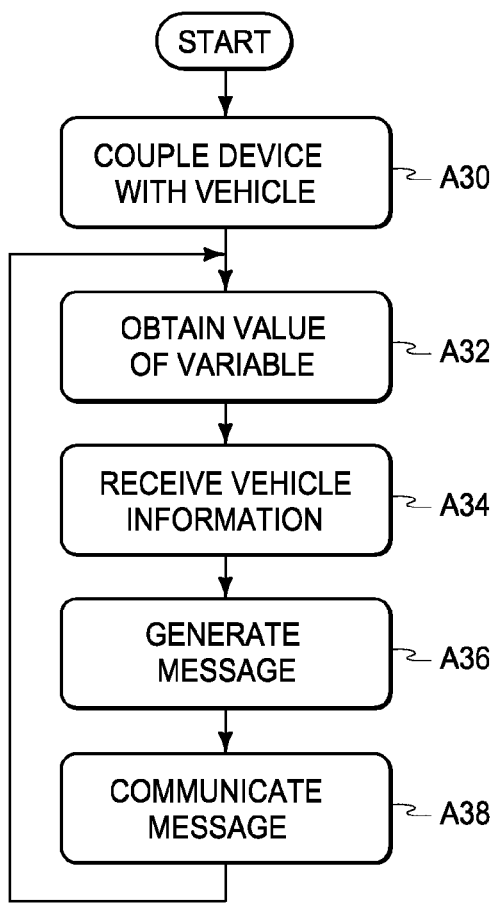
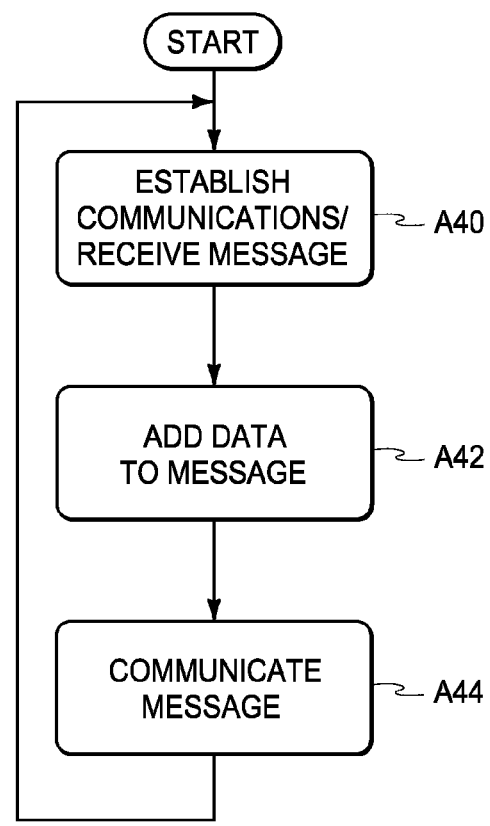
FIG. 4
FIG. 5

VEHICLE MONITORING DEVICES, VEHICLE MONITORING MANAGEMENT DEVICES, AND VEHICLE MONITORING SYSTEMS

RELATED PATENT DATA

This application claims priority to U.S. Provisional Patent Application Ser. No. 62/136,329, which was filed on Mar. 20, 2015, entitled "Object Monitoring System and Methods," the disclosure of which is incorporated herein by reference.

TECHNICAL FIELD

This disclosure relates to vehicle monitoring devices, vehicle monitoring management devices, and vehicle monitoring systems.

BACKGROUND OF THE DISCLOSURE

Many vehicle dealerships, such as automobile dealerships, utilize bank financing to purchase vehicles for their lots. A bank issued loan for an automobile is typically paid off once the automobile is sold by the dealership. Accordingly, many banks may perform audits of automobile dealers' lots to assure that the vehicles which were purchased using funds of the banks are still on the automobile dealers' lots. Current best practice is to have a person, who is trusted by the bank, walk the vehicle lot of the dealerships and physically touch the vehicles and verify the vehicles.

At least some of the embodiments described below increase the efficiency of the vehicle verification process compared with manual verification of the vehicles. Additional embodiments of the disclosure may be used to provide other information regarding the vehicles as described further below.

BRIEF DESCRIPTION OF THE DRAWINGS

Example embodiments of the disclosure are described below with reference to the following accompanying drawings.

FIG. 4 is a flow chart of a method performed by a monitoring device according to one embodiment.

FIG. 5 is a flow chart of a method performed by an intermediary device according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

At least some embodiments of the disclosure include apparatus and methods of monitoring objects. In more specific embodiments, the apparatus and methods provide monitoring and tracking of a plurality of vehicles, such as automobiles upon a lot of a vehicle dealership. Other objects may be monitored and tracked in other implementations.

Example described embodiments provide reliable and trustworthy systems and methods that a bank can believe will correctly report when a vehicle is on a vehicle lot. The device will not necessarily indicate when a device is not on a vehicle lot, but if the monitoring device does report that the vehicle is on the lot, then it can be trusted. The assumption is that while the vehicle is on the lot, then the dealer is justified in continuing the loan and will not need to pay off the vehicle loan. Banks expect loans for vehicles which are no longer on the lots of the vehicle dealerships, or are otherwise no longer within the inventories of the vehicle dealerships to be paid off. Accordingly, banks may utilize the apparatus and methods of the disclosure to determine whether the vehicle dealerships are properly following contractual obligations associated with the financing of vehicles which have been sold in one implementation.

In some embodiments described below, a plurality of vehicle monitoring devices of a vehicle monitoring system communicate with respective vehicles being monitored and communicate information regarding the vehicles to a management device which may implement vehicle monitoring. The management device may provide information regarding the vehicles being monitored to banks as well as other desired parties, such as the vehicle dealerships themselves, in one embodiment.

In addition, some embodiments of the disclosure may be used to provide other information regarding the vehicles being monitored. For example, information regarding the locations of the vehicles on the dealership lots may be provided as well as information indicating if a vehicle monitoring device has been removed from one vehicle and placed in another vehicle.

Figure 1:
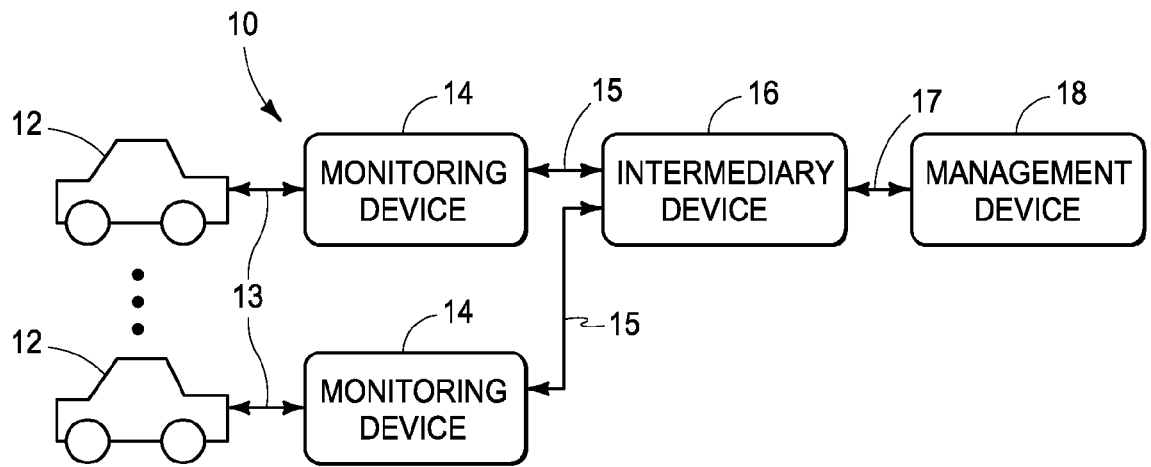
FIG. 1 is an illustrative representation of a vehicle monitoring system according to one embodiment.

Referring to FIG. 1, one example embodiment of a vehicle monitoring system 10 is shown. The example illustrated system includes a plurality of vehicle monitoring devices 14, one or more intermediary device 16 and a management device 18. Other embodiments including more, less and/or alternative devices are possible. For example, intermediary device 16 may be omitted in some embodiments and the monitoring devices 14 may communicate directly with management device 18.

The monitoring devices 14 are configured to monitor a plurality of vehicles 12, for example, within inventory of a vehicle dealership. The monitoring devices 14 may also be referred to as diagnostic devices. In the illustrated embodiment, the monitoring devices 14 are configured to establish respective communications 13 with respective vehicles 12. In a more specific embodiment, the monitoring device 14 communicates with an on-board computer or other circuitry of the vehicle being monitored (e.g., the device 14 may be coupled with an OBD socket of vehicle 12). In some arrangements, the monitoring device 14 may receive operational energy from the vehicle 12 as well.

The monitoring devices 14 are configured to receive information regarding the vehicles 12 being monitored at a plurality of moments in time (e.g., continuously) via communications 13 and are configured to generate a plurality of messages including the information regarding the vehicles 12 being monitored and perhaps other data as described further below. Furthermore, the monitoring devices 14 may output the generated messages externally of the monitoring devices 14 via respective communications 15. As discussed below, the generated messages may also include timing data which may be used to validate the associated data included within the messages in example embodiments of the disclosure.

The intermediary device 16 communicates with and receives the messages from the monitoring devices 14 via the communications 15. Some embodiments may include a plurality of intermediary devices 16 which communicate with the monitoring devices 14, although only one intermediary device 16 is shown in FIG. 1.

In example embodiments, the intermediary device 16 is a computing device such as a smart phone running an application, a notebook computer, a tablet computer, etc. The intermediary device 16 is configured to receive the messages and data from the monitoring devices 14, including information regarding the vehicles 12 being monitored, and to output the received data and perhaps other data as described further below in a plurality of messages via communications 17. As discussed further below, additional timing data may be added to the messages in one embodiment. For example, the additional timing data may include timestamps of the dates and times the respective messages were received by the intermediary device 16.

The management device 18 communicates with and receives the messages from the intermediary devices 16 via the communications 17 in the illustrated embodiment. The management device 18 may receive the messages directly from the monitoring devices 14 in other embodiments.

The management device 18 is implemented as a server in one possible implementation. The management device 18 is configured to receive the messages and data from the intermediary devices 18 including information regarding the vehicles 12 being monitored and additional information. The management device 18 processes the received data of the messages and generates reports and alerts with respect to the vehicles or other objects being monitored. In some embodiments, management device is also configured to generate timing data for the messages corresponding to moments in time when the respective messages are received by the management device 18. Furthermore, management device 18 may be configured to monitor and manage vehicles on a plurality of different lots of different vehicle dealerships in one embodiment.

The communications 13, 15, 17 may be implemented using an appropriate form for communicating data including wireless and/or wired communications. In more specific examples, communications 13, 15, 17 may each be implemented using one or more of Bluetooth, WiFi, cellular, wired connections and/or other wireless communications.

Figure 2:
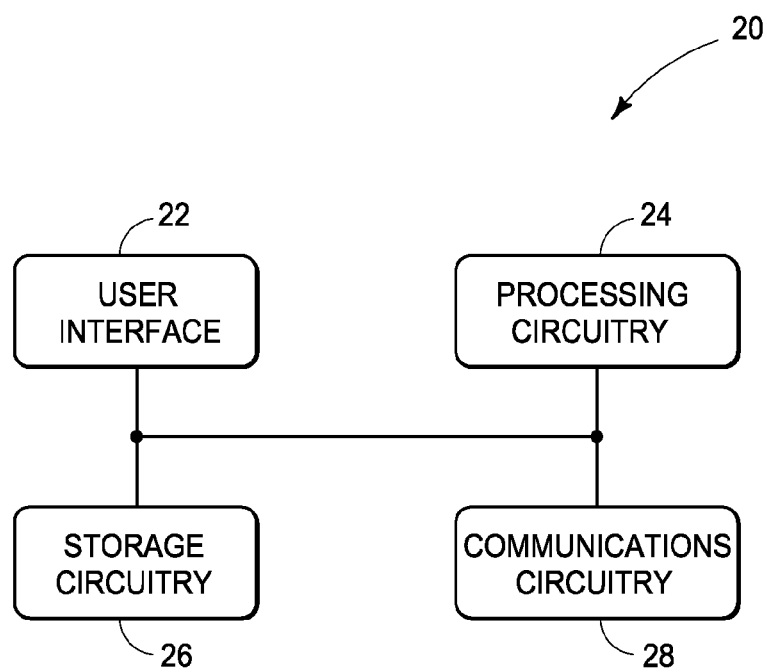
FIG. 2 is a block diagram of a computing device according to one embodiment.

Referring to FIG. 2, an example computing device 20 is shown according to one embodiment. One or more of the monitoring device 14, intermediary device 16 and management device 18 have the configuration of the illustrated computed device 20 in example embodiments. In the example embodiment, computing device 20 includes a user interface 22, processing circuitry 24, storage circuitry 26, and communications circuitry 28. Other embodiments of computing device 20 are possible including more, less and/or alternative components or circuitry.

User interface 22 is configured to interact with a user including conveying data to a user (e.g., displaying visual images for observation by the user) as well as receiving inputs from the user, for example using one or more input device, keyboard, touchscreen, etc.

In one embodiment, processing circuitry 24 is arranged to process data, control data access and storage, issue commands, and control other desired operations. Processing circuitry 24 may comprise circuitry configured to implement desired programming provided by appropriate computer-readable storage media in at least one embodiment. For example, the processing circuitry 24 may be implemented as one or more processor(s) and/or other structure configured to execute executable instructions including, for example, software and/or firmware instructions. Other example embodiments of processing circuitry 24 include hardware logic, PGA, FPGA, ASIC, state machines, and/or other structures alone or in combination with one or more processor(s). These examples of processing circuitry 24 are for illustration and other configurations are possible.

Storage circuitry 26 is configured to store programming such as executable code or instructions (e.g., software and/or firmware), electronic data, databases, or other digital information and may include computer-readable storage media. At least some embodiments or aspects described herein may be implemented using programming stored within one or more computer-readable storage medium of storage circuitry 26 and configured to control appropriate processing circuitry 24. In one embodiment, information regarding vehicles being monitored may be stored using storage circuitry 26.

The computer-readable storage medium may be embodied in one or more articles of manufacture which can contain, store, or maintain programming, data and/or digital information for use by or in connection with an instruction execution system including processing circuitry 24 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications circuitry 28 is arranged to implement communications of computing system 10 with respect to external devices (not shown). For example, communications circuitry 28 may be arranged to communicate information bi-directionally with respect to computing system 10 and include hardware for wired connections (e.g., network interface card (NIC), serial or parallel connections, USB port, Firewire interface), and/or circuitry for wireless connections (e.g., Bluetooth, Cellular, GPS, WiFi, etc.).

In one embodiment, the vehicle monitoring system 10 uses an independent timing protocol or reference to synchronize the monitoring devices 14 and management device 18 in time and which may be utilized to assure that the generated information regarding the vehicles being monitored is valid and can be trusted. The independent timing protocol is independent in the sense that it is not based upon a calendar based timing system (e.g., date and time of day) in one arrangement. In one embodiment, timing data or information of the independent timing protocol is internally generated within the vehicle monitoring system 10 without the use of any communications which originate external of the vehicle monitoring system 10, for example GPS signals. The use of timing data which is independent of a calendar based timing system provides a system 10 of increased security since the timing data is not readily apparent to those not aware of the independent timing protocol or reference being utilized.

In one embodiment, a monitoring device 14 is configured to generate timing data of the independent timing protocol which is indicative of timing of the information regarding the vehicle (e.g., the timing data may be indicative of moments in time when the respective vehicle information is received from the vehicle). The timing data is used to synchronize the management device 18 with the monitoring device 14 and can be used to determine whether the vehicle information contained within the messages communicated from the monitoring device 14 is valid or has expired in one implementation.

In one embodiment, the timing data generated by the monitoring device 14 is a plurality of values of a timing variable at different moments in time. In a more specific example, monitoring device 14 generates a first value of the timing variable that is thereafter incremented periodically to generate subsequent timing data (e.g., incremented values of the timing variable which are indicative of passages of time for the information regarding the vehicle contained within the respective messages from the first value of the timing variable) in accordance with parameters of the independent timing protocol. For example, the parameters may define to increment the first (or updated) value of the timing variable by a known amount (e.g., one) according to a period (e.g., hourly). The values of the timing variable at the different moments in time are the timing data within the messages which may be used as a rolling timestamp reference of the independent timing protocol in one implementation.

In one embodiment, the timing variable is an integer and the first value of the integer is randomly generated by the monitoring device 14 when the monitoring device 14 is powered-up (e.g., coupled with the OBD port of the vehicle). The monitoring device 14 may randomly generate a new first value of the timing variable each time the device 14 is powered-up from a powered-down state in one implementation. In other embodiments, the first value of the timing variable may be generated by another device (e.g., management device 18) and communicated to the monitoring devices 14.

The management device 18 is aware of the independent timing protocol (e.g., the frequency of updates to the value of the timing variable and the amount of each update) in one embodiment. The management device 18 may not receive all messages which are outputted by the monitoring device 14. However, once a message is received from the monitoring device 14, the management device 18 performs a registration process described below with respect to the monitoring device 14 and associated vehicle. The value of the timing variable contained within the first message which is received by the management device 18 from the monitoring device 14 may be used as an initial value of the timing variable which corresponds to or indicates an initial reference moment in time of the independent timing protocol. This initial reference moment in time may be used to generate subsequent timing data (e.g., updated values of the timing variable) which may be compared with timing data within subsequent messages which are received from the monitoring device 14.

Accordingly, the monitoring device 14 and management device 18 may be considered to be synchronized with the independent timing protocol after management device 18 has received the initial value of the timing variable and which may be used as a registration value as described further below. In some embodiments, the parameters of the independent timing protocol may be changed at different moments in time for additional security of the timing data contained within the messages. In addition, different parameters of the independent timing protocol may be used for communications of the management device 18 with different monitoring devices 14 in one embodiment.

In one embodiment, the processing circuitry of the monitoring device 14 randomly generates the first value of the timing variable upon power-up and thereafter increments the value of the timing variable. As discussed above, different values of the timing variable are timing data which are included within different messages generated by the monitoring device 14 and are associated with different information regarding the vehicle which is received from the vehicle at a plurality of moments in time. Accordingly, in one embodiment, the timing data of a given message corresponds to and indicates the respective timing of the receipt of the information regarding the vehicle by the monitoring device 14 which is contained with the message, and which indicates the amount of time which has passed since the initial reference moment in time. In one more specific example, the values of the timing variable included in the messages correspond to the moments in time when the information regarding the vehicle contained within the respective messages was received by the monitoring device 14. The messages including the timing data may be referred to as timestamped messages in one embodiment.

For example, the value of the timing variable when information regarding the vehicle is received may be associated with the respective information regarding the vehicle in an individual message. Thereafter, the value of the timing variable is incremented and the incremented value indicates the passage of time from the initial reference moment in time to the moment in time when subsequent information regarding the vehicle is received by the monitoring device 14. The incremented value of the timing variable may be associated with the subsequently received information regarding the vehicle in one of the subsequent messages in one embodiment.

As mentioned above, the monitoring device 14 is configured to determine the first value of the timing variable after the monitoring device 14 is coupled with and establishes communications with the vehicle 12 via the OBD port in one example embodiment. For example, upon coupling with the OBD port of the vehicle 12, the monitoring device 14 receives power from the vehicle 12 and communicates with the vehicle 12, and as a result randomly generates the first value of the timing variable.

As mentioned previously, one of the monitoring devices 14 implements communications 13 with respect to a vehicle being monitored, for example, via an OBD port or socket of the vehicle. In one embodiment, processing circuitry of the monitoring device 14 executes software that queries the vehicle for vehicle information such as the vehicle's unique vehicle identification number (VIN) and then also receives and encrypts the following data into an encrypted data packet or message (e.g., a 31-32 byte encrypted code): (1) the queried VIN; (2) the integer/incremented integer; (3) the monitoring device's factory-assigned unique media access control (MAC) code; and (4) any other information regarding the vehicle, such as mileage, fuel level, etc.

Encryption of the data in the messages adds additional protection to the data therein and increases the difficulty of re-engineering the operations of the system. The encrypted data may include the information regarding the vehicle contained within the message as well as the timing data (e.g., value of the timing variable) which indicates the timing of when the information regarding the vehicle was received by the monitoring device 14.

In one embodiment, the monitoring device 14 is configured to periodically and continuously, such as once a second, output the timestamped, encrypted messages via communications 15. The encryption of the data within the messages, for example, including the timing data and the VIN of the vehicle, makes it more difficult for other parties to obtain and replicate the data, including the timing data. Without the timing data, it is more difficult for other parties to generate messages which will not be detected as being invalid as described further below.

In one operational method, intermediary device 16 is moved throughout different geographical locations of a lot of the vehicle dealership. The intermediary device 16 is placed in a "scan" mode in one implementation to be able to receive the broadcast messages from the monitoring devices 14 of vehicles of the dealership as the intermediary device 16 is moved throughout the lot.

In one embodiment, the intermediary device 16 receives the messages which were broadcast from the monitoring devices 14, and executes its own software program that may add various data to the messages. For example, in one embodiment, timestamp data indicative of times and dates when the messages were received by the intermediary device 16 and location data (e.g., GPS, latitude, longitude) of the intermediary device 16 when the messages were received by the device 16 are added to the messages.

In some embodiments, management device 18 may add timestamp data to the messages which is indicative of the times and dates when the messages are received by the management device 18 and the intermediary device 16 may or may not add its respective timestamp data to the messages.

In one embodiment, the intermediary device 16 comes into the transmission range of the monitoring device 14 and either automatically receives the broadcast messages from the monitoring device 14, or does a scan for devices emitting messages and discovers the broadcast messages. Following the addition of any data to the received messages, the intermediary device 16 outputs the timestamped, encrypted data messages (with any additional data) via communications 17 to management device 18. In one embodiment, the intermediary device 16 does not decrypt the data contained in the received messages, but rather adds additional data to the messages and outputs the messages externally of the intermediary device 16 via communications 17. In one embodiment, the intermediary device 16 is unaware of and cannot access encrypted data of the messages, such as the first timing data (e.g., values of the timing variable).

The management device 18 receives the transmitted messages from the intermediary device 16 via communications 17 and executes a software program that decrypts the messages, and extracts and processes the data therein including the VIN, the MAC, the information regarding the vehicle being monitored, and the value of the timing variable in one embodiment. For example, the data may be processed including comparing data within the messages with records of the vehicles being monitored in a database as discussed further below. The management device 18 may generate reports and alerts regarding the vehicles being monitored as a result of the processing of the data in the messages and the records in the database. Management device 18 may also add timestamp data to the messages which indicates the times and dates of receipt of the respective messages.

Additional details regarding processing of data within the messages by the management device 18 are described below according to one illustrative embodiment. The management device 18 stores or has access to a stored database with vehicle data records of the vehicles being monitored in one embodiment. The management device software searches the database to see if a record exists for the VIN pulled from a received message in one embodiment. For example, the database may include a plurality of records for a plurality of vehicles being monitored. In one more specific embodiment, the records may correspond to vehicles in an automobile dealer's inventory which were purchased from a manufacturer using loaned funds from a bank or other financial institution. As mentioned previously, the disclosed systems and methods of monitoring vehicles may be used by the bank to verify that the automobiles which have not been sold (and the corresponding loans not paid off) are still on the dealer's lot in one example application.

If no record exists for the vehicle, the management device software program creates a "registration" or reference record for the VIN that includes all the data in the message. Notably, the record includes the initial value of the timing variable which was included in the first message which was received by the management device from the monitoring device as a base timestamp of the independent timing protocol, and to which timing data of subsequently-received messages is compared and which may be used to provide time synchronization of the management device 18 with the respective monitoring device 14 which generated the message. The initial value of the timing variable may also be referred to as the registration value of the timing variable and corresponds to an initial reference moment in time of the independent timing protocol. This completes the "registration" process for the monitoring device 14 and corresponding vehicle being monitored in the system. Accordingly, in one embodiment, the records of the vehicles being monitored are added to the database over time as messages are received by the management device 18.

The initial value of the timing variable may not be the first value of the timing variable generated by the monitoring device 14. For example, one or more messages including different values of the timing variable may not be received by the management device 18, and accordingly, the initial value of the timing variable may be an updated value of the timing variable which has been updated from the first value.

If a vehicle data record already exists in the database for the VIN of a vehicle within a received message, the management device software program performs a comparison of the data based on the VIN and stores any new data from the message into the vehicle data record of the respective vehicle in one embodiment.

In addition, the management device 18 processes the data of the received message to determine whether the information regarding the vehicle being monitored and contained within the message is valid (as well as the other data included in the message) in the described embodiment. More specifically, in one embodiment, the processing circuitry of the management device 18 uses different timing data of the messages themselves to determine whether the data contained with the messages is valid.

In one embodiment, the processing circuitry of the management device 18 compares different timing data of the messages (e.g., timing data of the independent timing protocol and timing data of a calendar based timing system) to determine whether the messages and data are valid. In a more specific embodiment, the processing circuitry uses the first timing data (e.g., initial value of the timing variable and the updated value of the timing variable contained with the current message being processed) as well as the parameters of the independent timing protocol to calculate a first amount of time between the message transmitted by the monitoring device 14 (and received by the management device 18) containing the initial (registration) value of the timing variable and the current message being processed. The processing circuitry also uses the time and date timing data of the calendar based timing system which is associated with the message which contained the initial value of the timing variable and the current message being processed to calculate a second amount of time between the respective messages. In particular, the processing circuitry calculates the second amount of time using the time and date timestamp of the message which contained the initial value of the timing variable and the time and date timestamp of the current message.

Accordingly, the first amount of time and second amount of time correspond to different calculations (using different timing protocols) of the passage of time from the initial reference moment in time to the moment in time associated with the current message being processed. As mentioned above, the different timing protocols are independent from each other in one embodiment, for example, one protocol based upon a calendar while the other protocol is independent of the calendar. In addition, timing data which is processed is generated by a plurality of different devices (e.g., monitoring device 14 as well as intermediary device 16 and/or management device 18) in one more specific embodiment.

In one embodiment, the first timing data contained with the messages generated by the monitoring device 14 is indicative of timing of the information regarding the vehicle (e.g., when the information regarding the vehicle was received by the monitoring device 14) and the second timing data is indicative of timing of the messages themselves, for example when the messages are received by the intermediary device 16 or management device 18.

The management device 18 compares the calculated first and second amounts of time to determine whether the message and data therein are valid. In one embodiment, the software allows for a specified grace period of time and the compared amounts of time are not expected to match exactly. In particular, if the differences in time calculated using the different timing data are within the specified grace period of time (e.g., 2 hours or less difference), then the message and data are determined to be valid. The message and data therein are determined to be invalid if the first and second amounts of time differ by an amount greater than the grace period. The comparison of the different amounts of time determined according to the different timing protocols makes the corresponding data of the message expire in one embodiment. This prevents someone from just recording the monitoring device broadcast and replaying it in an attempt to spoof the system. If the result of the time comparison is outside the expected time frame (e.g. two hours), then it is considered that someone is trying to spoof the system 10 and the management device 18 will generate an alert to report that something suspicious may be occurring for additional investigation of the respective vehicle being monitored.

In one embodiment, if the time periods of the different timing protocols match up, the message is valid and the data of the message is stored in the database and the VIN is verified which indicates that the vehicle is on the dealer's lot. If the time periods do not match up, the software generates an alert of some kind in one embodiment. The alert is used to indicate that there may be an issue with the vehicle which corresponds to the VIN for further investigation in one embodiment. In example embodiments, a display of the management device 18 may communicate the alert and an email or text alert may also be sent from the management device 18 to appropriate personnel. Any appropriate form for an alert may be used.

In one embodiment, if the monitoring device 14 is unplugged from the vehicle 12 for any reason or if the vehicle's battery is drained and no power is provided to the monitoring device 14 from the vehicle 12, the monitoring device 14 is automatically cleared and needs to be re-registered when it's plugged back into either a new vehicle 12 or when the vehicle's battery is charged and again supplying power to the monitoring device 14. All data is cleared in the monitoring device 14 including the obtained VIN, the value of the timing variable, the MAC, etc. when power is lost in one embodiment. When a new power source is supplied, the monitoring device 14 automatically re-generates a new random value of the timing variable, re-queries the on-board computer for the vehicle's VIN, re-obtains its own MAC address, and begins generation and communication of messages in one arrangement.

When the monitoring device 14 loses power from the vehicle 12 for any reason, it stops broadcasting messages in one embodiment. The failure of the management device 18 to receive a message within a specified amount of time for a given record/vehicle is used in one embodiment to generate an alert for further investigation of the vehicle which corresponds to the record. For example, if the broadcast messages from a monitoring device 14 stop, but the system expects them to continue, such as the intermediary device 16 coming within range of where the vehicle 12 with the monitoring device 14 is expected to be, the software on the management device 18 generates an alert indicating the lack of receipt of a broadcast message from the particular monitoring device 14 so any necessary follow-up can be performed to locate the corresponding vehicle.

In one embodiment, messages from a given monitoring device 14 and based upon the same initial value of the timing variable must be continuously received within a given amount of time from previously-received messages from the same monitoring device 14, or otherwise an alert may be generated by the management device 18 and sent to appropriate personnel regarding the corresponding vehicle 12 of the monitoring device 14 for further investigation to determine whether the vehicle 12 is on the dealer's lot or not. The amount of time in which the messages are to be received to avoid the generation of an alert may be varied for different implementations. For example, for more risky dealers, the amount of time may be less, such as every two days, while the amount of time may be longer, such as every six weeks, for other dealers.

The vehicle monitoring system 10 may also provide additional information regarding the vehicles being monitored. For example, information regarding the locations of the vehicles on the dealership lots may be provided to the dealers on a continuous basis.

Figure 3:
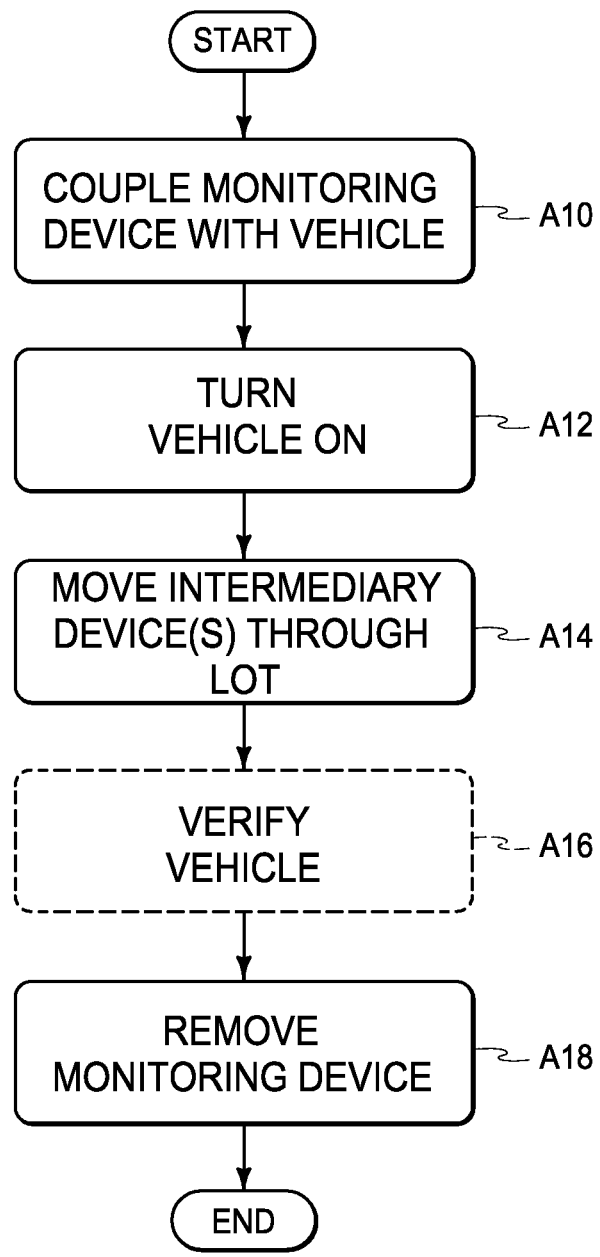
FIG. 3 is a flow chart of an implementation of use of the vehicle monitoring system according to one embodiment.

Referring to FIG. 3, use of systems and methods of the disclosure for vehicle financing by banks is described in one example implementation. As a condition of a bank loan for a vehicle, the dealer agrees to the following conditions in one example:

At an act A10, the vehicle dealer plugs the monitoring device into the vehicle soon (or immediately) after the loan is started. This will often be soon after the vehicle is dropped at the dealer lot by the factory.

At an act A12, the vehicle is turned on sometime soon after installation of the monitoring device. The exact timing of turning on the vehicle is not important. The vehicle needs to be turned on at least once before the monitoring device can be detected in one embodiment. The monitoring device queries the vehicle for information as discussed previously and also generates the first value of the timing variable. Thereafter, following detection, the vehicle may be turned off and the monitoring device continues to receive operational energy from the vehicle after the vehicle is turned off in one embodiment.

At an act A14, one or more employees of the vehicle dealership will run an application on their intermediary devices while they are walking the vehicle lots as already part of their jobs. The application runs in the background on their intermediary devices and does not require any input from the intermediary device operators in one embodiment. Except for manual vehicle verification discussed below in act A16, this example vehicle monitoring application does not require any more additional walking by the employees then is already being done throughout the work day. While vehicle monitoring may be accomplished using one intermediary device, all employees who routinely walk the lots or move vehicles, may have associated intermediary devices to provide improved results, such as more frequent updates with respect to the vehicles being monitored.

At an act A16, although seldom needed, upon request of the bank, the dealer will have someone who is using the application on their intermediary device walk out to where the vehicle being monitored is in order to update the location of the vehicle and generate at least one valid message to prove to the bank that the vehicle is still on the lot. This should rarely be needed if many employees are running the application on their intermediary devices since their devices will routinely report information regarding the vehicles as described above.

At an act A18, when the vehicle is sold, then the monitoring device will be removed from the vehicle and kept by the dealer for use on a different vehicle later.

In addition to the benefits provided to the bank in this example, the dealer benefits in having instant access to the last known location of the vehicle on his lot in one embodiment. This instant access of vehicle location may be provided to a dealer for a fee in one arrangement.

Some of the benefits of the systems and methods of the disclosure to the bank include less expensive audits as a person may not be needed to do the audit or the person will not be spending as much time doing the audit. Nearly instant audits may be performed at an increased frequency (currently audits are done every 2 to 6 months in some arrangements). In addition, issues or problems regarding financed vehicles may be caught earlier. By doing audits more frequently, problems are caught sooner as well as cause the dealer to be more prompt and honest in dealing with the bank. In addition, loans to smaller dealers may become more practical which may open new markets for the bank (currently small dealers in out-of-the-way locations can be prohibitively expensive to audit). Vehicle mileage information may be provided since the last time that the OBD was cleared which will help indicate to the bank whether excessive mileage has been added to the vehicle since the start of the loan. Information regarding fuel and battery levels of the vehicles may be provided to the dealer for use and information regarding the last time that the vehicle was started may be provided to the bank which helps establish the existence of the engine in the vehicle. In addition, information may be provided indicating if a vehicle monitoring device has been removed from one vehicle and placed in another vehicle (e.g., by recognizing the failure of the management device to receive a message from the initial vehicle as well as recognizing the receipt of the new messages from the same monitoring device which is coupled with the subsequent different vehicle).

Referring to FIG. 4, a flow chart of operations performed by a monitoring device are described according to one embodiment. Other embodiments are possible including more, less and/or alternative acts. The described acts are controlled using processing circuitry of the monitoring device in one embodiment.

Initially, at an act A30, communications are established between a vehicle to be monitored and a monitoring device. For example, the monitoring device may be coupled with the OBD port of the vehicle in one arrangement.

At an act A32, the monitoring device obtains a first value of a timing variable of the independent timing protocol for time synchronization with other devices. The first value of the timing variable may be randomly generated and used for the initial message regarding the vehicle in one embodiment. Thereafter, the monitoring device periodically increments the value of the timing variable a known amount in accordance with the independent timing protocol, and additional messages after the initial message include the respective updated values of the timing variable which also correspond to the moments in time when the additional messages are generated in one embodiment.

At an act A34, the monitoring device receives information regarding the vehicle being monitored as discussed above.

At an act A36, the monitoring device generates a message including the first (or updated) value of the timing variable and the information regarding the vehicle. The data within the message is encrypted in one embodiment.

At an act A38, the monitoring device communicates the generated message externally of the monitoring device.

The process of FIG. 4 returns to act A32 and continuously generates and outputs additional messages with new data corresponding to the moments in time when the additional messages are generated and/or vehicle information is received from the vehicle being monitored.

Referring to FIG. 5, a flow chart of operations performed by an intermediary device are described according to one embodiment. Other embodiments are possible including more, less and/or alternative acts. The described acts are controlled using processing circuitry of the intermediary device in one embodiment.

An intermediary device in the vicinity of the monitoring device receives an outputted message from the monitoring device at an act A40.

At an act A42, the intermediary device adds additional data to the message including a timestamp (e.g., date/time information and location data of the intermediary device from GPS when the message is received).

At an act A44, the intermediary device communicates the message with the additional data externally of the intermediary device.

The method of FIG. 5 returns to act A40 and the intermediary device continues to monitor for the reception of additional messages from the monitoring device at act A40 which are processed as discussed above.

Figure 6:
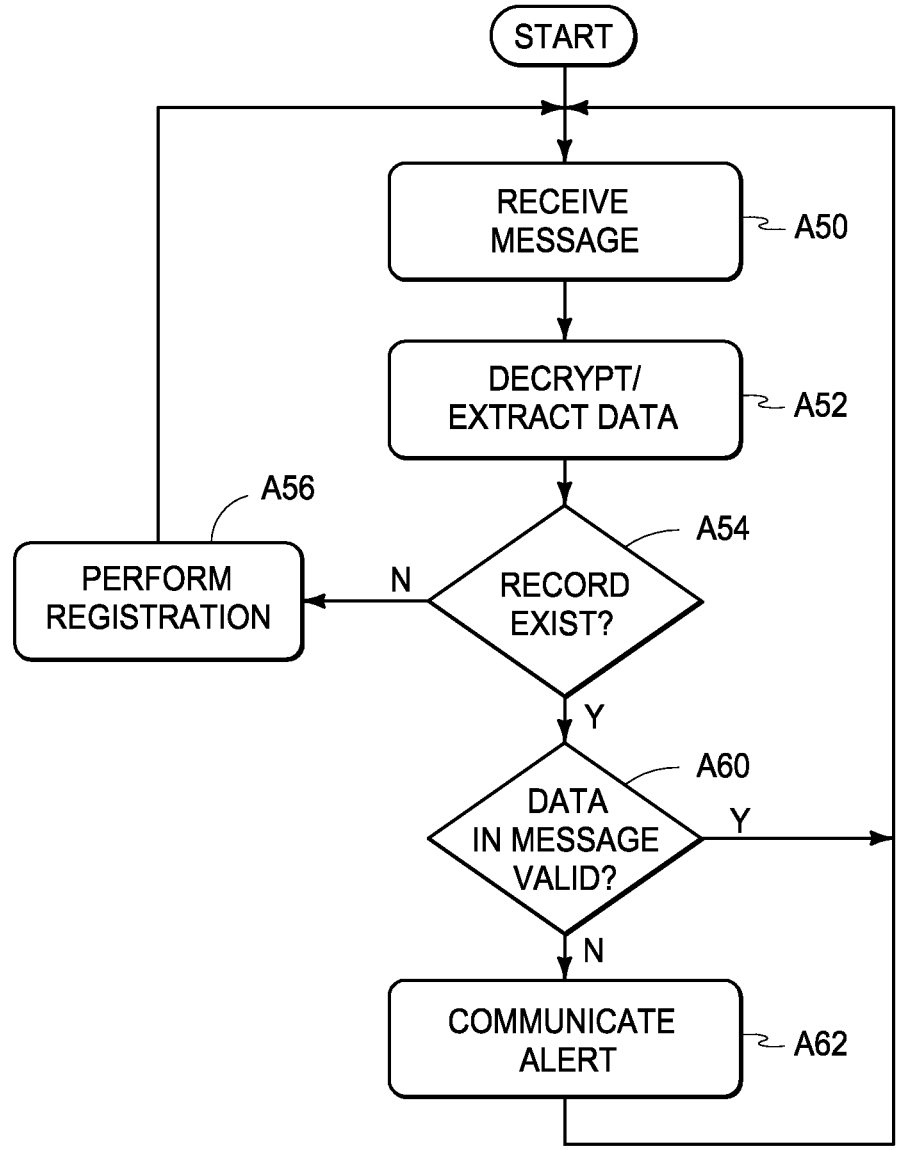
FIG. 6 is a flow chart of a method performed by a management device according to one embodiment.

Referring to FIG. 6, a flow chart of operations performed by a management device are described according to one embodiment. Other embodiments are possible including more, less and/or alternative acts. The described acts are controlled using processing circuitry of the management device in one embodiment.

At an act A50, the management device receives the message communicated by the intermediary device.

At an act A52, the management device decrypts and extracts the data of the received message.

At an act A54, the management device uses the VIN contained within the message to determine whether a record exists for the respective VIN.

If not, the process proceeds to an act A56 and a registration operation for the vehicle is performed including storing the data of the message including the value of the timing variable as the initial value of the timing variable which is used as an initial timing reference and synchronizes the management device in time with the monitoring device. Thereafter, the management device monitors for the receipt of additional messages.

If a record exists for the vehicle, the management device determines whether the data and the message are valid at an act A60. In one embodiment, the management device uses the timing data of the different timing protocols in order to validate the data and message. As described above, the management device may use the respective values of the timing variable and the date/time information of the message which contained the initial value of the timing variable and the currently processed message to calculate respective amounts of time which have passed since registration to determine whether the data and message are valid. The currently processed message includes first timing data in the form of the updated value of the timing variable which may be used with the initial value of the timing variable to calculate a period of time which has passed between the message which contained the initial value of the timing variable and the current message being processed according to the independent timing protocol. The message also includes second timing data in the form of the date/time timestamp (added to the message by the intermediary device or the management device) and the timestamp may be used with the timestamp of the initial message received from the monitoring device regarding the vehicle to calculate another period of time which has passed between the initial message and the current message. If the periods of time calculated using the first and second timing data are within a grace amount of time (e.g., within two hours), then the data is determined to be valid and is stored. Otherwise, the data is determined to be invalid.

If the result of act A60 is negative, the management device generates and communicates an alert to appropriate personnel at an act A62 and which indicates that the data of the vehicle is invalid and further investigation of the vehicle may be performed.

If the result of act A60 is affirmative or following act A62, the management device monitors for the receipt of additional messages regarding the vehicle from the monitoring device.

In some implementations, the monitoring device may be unplugged from a vehicle (for example to allow a service/scanning device to be coupled with the vehicle using the OBD port). Thereafter, the monitoring device may again be plugged into the same vehicle following the service. In this situation, the new value of the timing variable received by the management device after the monitoring device was again plugged into the vehicle would not match the expected value of the timing variable before the monitoring device was unplugged. In one embodiment, the management device would generate an alert due to the mismatch of the value of the timing variable. In addition, the management device may use the received mismatched value of the timing variable as a new initial or registration value of the timing variable for use with respect to validating subsequently received messages.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A vehicle monitoring device comprising:
   first circuitry configured to communicate with circuitry of a vehicle being monitored and to receive information regarding the vehicle at a plurality of moments in time;
   second circuitry coupled with the first circuitry and configured to generate a plurality of messages, wherein individual ones of the messages include the information regarding the vehicle which was received at one of the plurality of moments in time and timing data which is indicative of timing of the information regarding the vehicle according to an independent timing protocol which is utilized by the vehicle monitoring device and another device which is remote from the vehicle monitoring device;
   wherein the first circuity is configured to communicate the plurality of messages externally of the vehicle monitoring device; and
   wherein the timing data included in an initial one of the messages synchronizes the another device in time with the vehicle monitoring device, and the timing data included in a subsequent one of the messages is utilized by the another device to validate the information regarding the vehicle which is included in the subsequent message.

2. The device of claim 1 wherein the timing data of the messages is a plurality of different values of a timing variable.

3. The device of claim 2 wherein the second circuitry is configured to determine a first value of the timing variable after the first circuitry communicates with the vehicle.

4. The device of claim 2 wherein the second circuitry is configured to determine a first value of the timing variable as a result of the first circuitry communicating with the vehicle.

5. The device of claim 2 wherein the second circuitry is configured to increment the value of the timing variable a plurality of times to generate the timing data, and wherein the messages include the different values of the timing variable which correspond to the timing of the reception of the information regarding the vehicle at respective ones of the moments in time.

6. The device of claim 5 wherein the second circuitry is configured to increment the value of the timing variable the plurality of times by a known amount in accordance with a known period.

7. The device of claim 5 wherein the second circuitry is configured to randomly generate a first value of the timing variable.

8. The device of claim 5 wherein the second circuitry is configured to encrypt the values of the timing variable within the messages before the communicating of the messages.

9. The device of claim 8 wherein the second circuitry is configured to encrypt the values of the timing variable using an identifier of the first circuitry.

10. The device of claim 1 wherein the first circuitry is configured to continuously communicate the plurality of messages.

11. The device of claim 1 wherein the timing data is used to determine a period of time which has passed since a reference moment in time.

12. The device of claim 1 wherein the second circuitry is configured to generate the timing data without use of any communications external of the vehicle monitoring device.

13. The device of claim 1 wherein the timing data is independent of calendar data.

14. The device of claim 1 wherein the first circuitry and second circuitry are electrically connected with one another.

15. The device of claim 1 wherein the timing data is indicative of the moments in time when the information regarding the vehicle was received by the vehicle monitoring device.

16. A vehicle monitoring management device comprising:
communications circuitry configured to receive a plurality of messages which individually include information regarding a vehicle being monitored and first timing data which is indicative of timing of the information regarding the vehicle being monitored; and
processing circuitry coupled with the communications circuitry, and wherein the first timing data within an initial one of the messages synchronizes the vehicle monitoring management device in time with respect to another device which received the information regarding the vehicle being monitored from the vehicle being monitored, and wherein the processing circuitry is configured to process the first timing data within a subsequent one of the messages with respect to second timing data to determine whether the information regarding the vehicle being monitored within the subsequent message is valid and to generate an alert with respect to the vehicle being monitored as a result of a determination that the information regarding the vehicle within the subsequent message is not valid, and wherein the first timing data is independent of the second timing data.

17. The device of claim 16 wherein the processing circuitry is configured to compare the first timing data with respect to the second timing data to process the first and second timing data and to generate the alert as a result of the comparison of the first and second timing data being different by at least a specified amount of time.

18. The device of claim 16 wherein the second timing data is indicative of timing of the subsequent message.

19. The device of claim 18 wherein the second timing data comprises a timestamp corresponding to a day and time of a calendar based timing system, and the first timing data is indicative of a passage of time from a reference moment in time which is independent of the calendar based timing system.

20. The device of claim 19 wherein the processing circuitry is configured to establish the reference moment in time as a result of the communications circuitry receiving the initial one of the messages.

21. The device of claim 19 wherein the processing circuitry is configured to compare a period of time between the timestamp and another timestamp of a previous message which included information regarding the vehicle being monitored with the passage of time indicated by the first timing data to determine whether the information regarding the vehicle being monitored is valid.

22. The device of claim 16 wherein the first timing data is a value of a timing variable which is continuously incremented a known amount at a rate by a device which communicates with the vehicle being monitored.

23. The device of claim 22 wherein the processing circuitry is configured to calculate passage of time using the value of the timing variable in the subsequent message and an initial value of the timing variable in the initial message.

24. The device of claim 16 wherein the first timing data is generated by a device which communicates with the vehicle being monitored, and the second timing data is generated by a device which communicates with the communications circuitry.

25. The device of claim 16 wherein the processing circuitry is configured to generate another alert with respect to the vehicle being monitored as a result of not receiving a message which includes information regarding the vehicle being monitored within a specified amount of time.

26. The device of claim 16 wherein the first timing data is indicative of moments in time when the information regarding the vehicle was received from the vehicle being monitored.

27. A vehicle monitoring system comprising:
a vehicle monitoring device configured to communicate with circuitry of a vehicle being monitored, to receive information regarding the vehicle at a plurality of moments in time, and to output a plurality of messages externally of the vehicle monitoring device;
wherein the messages individually include the information regarding the vehicle which was received at one of the plurality of moments in time and first timing data which is indicative of timing of the information regarding the vehicle which is contained with the individual message; and
a management device configured to use the first timing data associated with an initial one of the messages to synchronize the management device in time with the vehicle monitoring device and to process the first timing data of a subsequent one of the messages with respect to second timing data which is independent of the first timing data to attempt to validate the information regarding the vehicle included within the subsequent message, and to generate an alert with respect to the vehicle as a result of the processing of the first and second timing data not validating the information regarding the vehicle included within the subsequent message.

28. The system of claim 27 wherein the management device is configured to generate the second timing data.

29. The system of claim 28 wherein the second timing data corresponds to timing of receipt of the first timing data within the management device.

30. The system of claim 27 wherein the messages are first messages, and further comprising an intermediary device configured to receive the first messages and to output a plurality of second messages which individually include the information regarding the vehicle contained within one of the first messages and the first timing data contained within the one of the first messages, and wherein the management device is configured to receive the second messages.

31. The system of claim 30 wherein the intermediary device is configured to include the second timing data in the second messages.

32. The system of claim 27 wherein the second timing data comprises a timestamp corresponding to a day and time of a calendar based timing system, and the first timing data is indicative of a passage of time from a reference moment in time which is independent of the calendar based timing system.

33. The system of claim 32 wherein the reference moment in time is determined using the initial one of the messages which was received by the management device from the vehicle monitoring device.

34. The system of claim 27 wherein the management device is configured to receive and store the information regarding the vehicle within a respective record for the vehicle being monitored.

35. The system of claim 27 wherein the first timing data is indicative of the moments in time when the information regarding the vehicle was received by the vehicle monitoring device.

* * * * *